No. 822,064. PATENTED MAY 29, 1906.
H. K. MILHAM.
REVERSIBLE OR FEATHERING SCREW PROPELLER.
APPLICATION FILED DEC. 21, 1905.
2 SHEETS—SHEET 1.
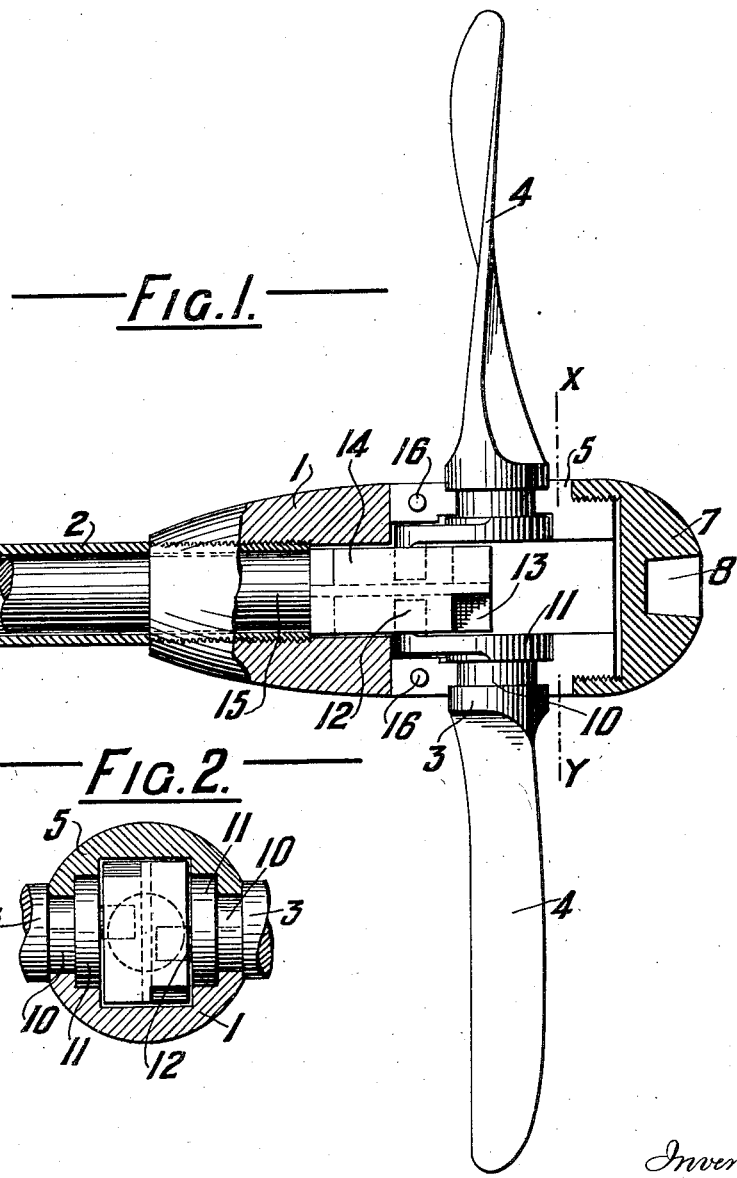
Witnesses
Chas. F. Smith
A. C. Birrell
Inventor
Harry Knight Milham,
per Harold Terrell
atty

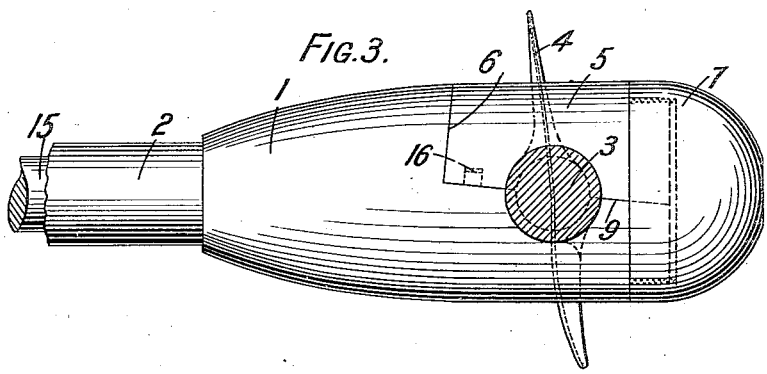
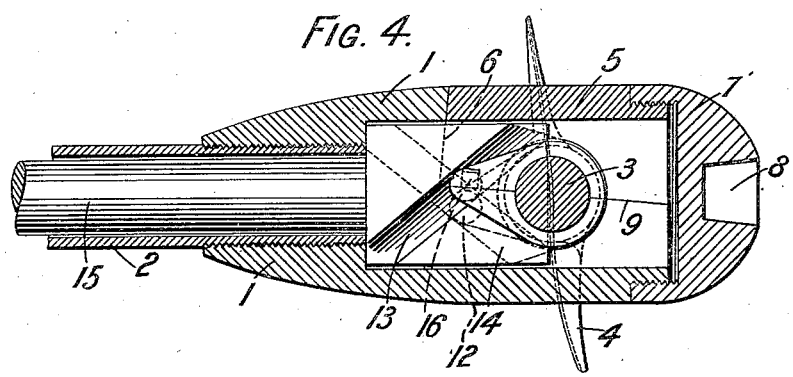
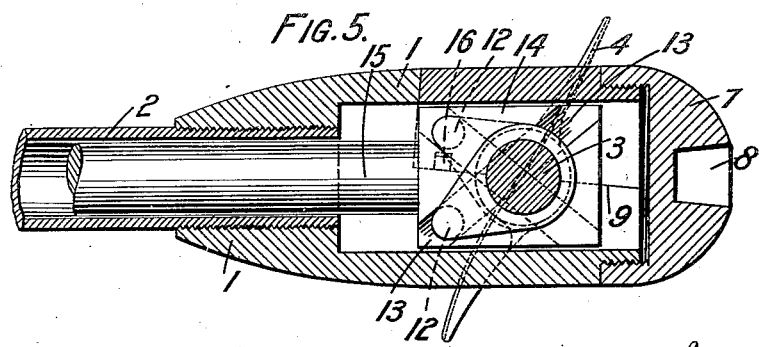

UNITED STATES PATENT OFFICE.

HARRY KNIGHT MILHAM, OF TWICKENHAM, ENGLAND.

REVERSIBLE OR FEATHERING SCREW-PROPELLER.

No. 822,064.      Specification of Letters Patent.      Patented May 29, 1906.

Application filed December 21, 1905. Serial No. 292,729.

*To all whom it may concern:*

Be it known that I, HARRY KNIGHT MILHAM, a subject of the King of Great Britain, residing at Twickenham, Middlesex, England, have invented certain new and useful Improvements in Reversible or Feathering Screw-Propellers, of which the following is a specification.

This invention refers to improvements in that known type of screw-propeller in which the helically-curved blades are constructed with spindles by which they are carried in the boss or hub of the propeller, the said boss containing within it the mechanism by which the spindles can be given angular motions about their axes in order to so set the blades of the propeller that the vessel will be driven either forwardly or astern, or the blades may be placed in a midway position, and so rendered ineffective for driving purposes. Such propellers are particularly applicable for use, for example, in boats or launches in which the propeller-shafts are driven in only one direction, as by explosion-engines, when the operation of reversing is effected by communicating to the blades angular motions about their axes. In such propellers having reversible blades it has been common to construct the hub in two parts, divided in a plane at right angles to the axis of the hub and coincident with the axes of the blade-spindles, and then such parts have been screwed or bolted together after the blade-spindles and the operating mechanism have been placed in position. Such a construction of hub, however, presents disadvantages in practical use. Thus inspection of the reversing mechanism within the hub calls for so much work and time in disconnecting and again assembling the parts as to render such a proceeding extremely difficult, and, moreover, when the hub is divided in a plane at right angles to its axis and including the axes of the blades, as is common, the transverse strains or thrust of the spindles of the blades are often taken by the attached part of the hub.

Now the object of the present invention is to provide a reversing or feathering propeller with a novel and simple construction of hollow boss whereby the thrust and transverse strains of the blades are taken by the body of the hub and whereby the contained mechanism for operating the blades can be exposed for inspection or for taking out and replacing the blades with the greatest possible ease, and to this end the curved wall of the hollow hub is formed with an aperture or apertures extending forward from the rearward end of the said body, so that the planes of the longitudinal edges of the wall of said hub at such aperture contain the axes of the blades, and where the axis of a blade-spindle meets the edge of the body at such aperture such edge is cut away to receive half of such spindle, a removable cover or lid being provided for each aperture, the edge or edges of the said cover being cut away to embrace the remaining half or halves of said blade spindle or spindles, the said lid dovetailing or interlocking at its forward end with the wall of the hub when in position and held at its rearward end by an end cap embracing the rear end of the hub and the rear end of said cover, means being provided for detachably fixing the said end cap in position. Thus the transverse strains of the blade-spindles are received by the walls of the hub, and the drive of the hub is transmitted to the blades through the walls of the body of the said hub. At the same time such a lid or cover can be easily removed, because by removing the end cap of the hub the cover will be left free to be lifted out, which can be effected with the greatest ease and the mechanism contained within the hub exposed for inspection, removal, or adjustment.

In propellers constructed according to my invention the spindles of the blades are shouldered within the walls of the hub so that when inserted therein and when the lid or cover is placed in position they are firmly held, while being free to have angular motions about their axes, and in order that such angular motions may be communicated to the blades I form or provide upon each of the blade-spindles within the hub a crank, each crank having a pin or stud engaging a groove in a block, the latter being capable of being slid within the hub parallel with the axis of the latter. The block is slid by means of a rod passing through the hollow propeller-shaft and operated by suitable mechanism, so that when the block receives rectilinear motion the inclined slots therein will operate the cranks and give axial adjustment to the blades. Such mechanism for operating the blades to reverse or feather I have found to be very efficient in action, not so liable to damage or disarrangement as the bevel-gearing commonly employed, and easily and cheaply constructed; but it will be obvious that I may well employ my improved construction of hub with other well-known mechanism for giving a feathering or reversing action to the blades.

I will now describe my invention with reference to an example of construction shown on the accompanying drawings, whereon—

Figure 1 shows in sectional plan a two-bladed reversing or feathering propeller constructed according to this invention, Fig. 2 being a vertical transverse section taken on the line X Y of Fig. 1. Fig. 3 is a sectional elevation of the same propeller, and Figs. 4 and 5 are vertical longitudinal sections showing the operating mechanism with the blades in two positions.

Referring to the drawings, the body 1 of the hollow boss is fixed to the tubular driving-shaft 2 by any suitable means, the body 1 of the hub being open at its rear end and having a segment of its circular wall cut away.

In the examples shown the aperture formed in the hub extends from the open rearward end forwardly, so that the plane of the longitudinal edge of the wall of the hub at the aperture would contain the axes of the blades, and at the point where the axis of the blade-spindle meets the edge of the body at such aperture such edge is cut away to receive half of each of the spindles 3 of the blades 4. Such an aperture is fitted with a lid or cover 5, the edge or edges of said cover being cut away to embrace the remaining half or halves of the said blade spindle or spindles, while at its forward edge 6 the cover is made to dovetail with the correspondingly-formed edge of the body 1 of the hub. When the lid 5 is placed in position, as shown at Figs. 4 and 5, it completes the wall of the hub, leaving the end thereof open, and the metal around this open end is shouldered and formed with a screw-thread to receive an internally-threaded end cap 7, which is formed or provided with some means, such as a recess 8, to receive a key by which it can be screwed onto the body of the hub or unscrewed therefrom, and when the end cap is in the position shown the cover or lid 5 is held firmly in position, while when unscrewed the lid 5 can be removed by the fingers of the attendant and will not only leave the mechanism open for inspection or lubrication, but will allow of the very ready removal of the blades 4 with their spindles 3, which is facilitated by the construction of the mechanism which I have adopted for operating the same for reversing or feathering.

It is very essential that the lid or cover 5 while being held at one end by the screwed end cap 7 should dovetail or interlock with the body 1 of the hub, so that any force exerted by the blades 4 should be received directly by the body of the said hub, and by making this removable lid or cover 5 to engage by dovetailing with the body of the hub this requirement is effected.

In the construction shown in the drawings the division 9 between the lid 5 and the body 1 of the hub extends in a plane which passes from the rear of the hub forwardly, is slightly inclined to the axis of the hub, and contains the axes of the blades, while the division at 6 between the end of the lid 5 and the body 1 of the hub is in a plane at right angles to the before-mentioned inclined plane, so that the lid or cover 5 is held by a wedge-like action and when so secured in place by the end cap is, as it were, locked in position, so that the drive of the blades is effected through the body of the hub and does not depend upon parts which are merely bolted thereto. With the hub of a propeller so divided diagonally through its after part, as has been described, I form the spindles 3 of the blades 4 with shoulders 10, (see Fig. 2,) bearing externally upon the hub and each with a crank 11 in the interior of the hub, so that the blades are firmly and securely held in their bearings in the hub. The cranks 11 have crank-pins 12, (shown by dotted lines at Figs. 2, 4, and 5,) and these crank-pins engage with diagonal or inclined grooves 13, one such being formed upon each side of a block 14, located within the hollow of the hub and guided therein, so as to be capable of moving parallel with the axis of the hub. The said block 14 is fixed to the end of a rod 15, which extends up the tubular driving-shaft 2 and is capable of being given the requisite motions to slide the block by any suitable or well-known mechanism not forming part of this invention.

It will now be understood that when the block is brought to a forward position relatively to the hub, as at Fig. 4, the propeller-blades will be rocked about their axes, so as to drive, say, in a forward direction, and when the block is slid to its farthest rearward position, as at Fig. 5, the blades will be rocked (for example) to drive rearwardly, while the block might be moved to an intermediate position, in which the blades would have no positive action. With such construction if it is required to remove the blades and their operating mechanism all that is necessary is to unscrew the end cap 7 and lift out the lid 5, when the blades can be quite easily removed from their half-bearings in the hub and the crank-pins 12 slid up the grooves 13. Similarly, the parts can as easily be replaced, and to facilitate this operation the edges of the lid 5 may be formed with holes to receive projecting pins 16, Fig. 1, so that upon the cover being placed in position, with the pins 16 entering the holes in the lid, the latter is maintained in its proper position, while the end cap 7 is screwed home.

It is obvious the hub can be constructed to carry more than two blades, and in the case of a three-bladed propeller the hub may be formed with two segmental apertures each provided with a lid or cover, one of such lids being formed at both its edges to complete the bearings for two of the spindles, while the second lid may be formed at one of its edges to complete the bearing for the remaining spindle.

What I claim as my invention, and desire to secure by Letters Patent, is—

1. In reversible or feathering screw-propellers; the combination with propeller-blades having spindle ends, and a hollow hub to receive the spindle ends of said blades said hub having an aperture through its wall extending forwardly from the rear end of same, the planes of the longitudinal edges of the wall of said hub at said aperture containing the axes of said blades said edges each having a semicircular recess at said axes adapted to receive half of a blade-spindle, and the forward edge of the wall of said aperture being inclined rearwardly; of a removable cover for said aperture, the longitudinal edges of said cover having semicircular recesses each adapted to embrace the remaining half of each blade-spindle, the forward edge of said cover being formed to contact and interlock with the forward edge of the wall of the hub at said aperture, means for detachably securing the rear end of the cover to the hub, mechanism contained within the hub for adjusting the blades about their axes, a tubular driving-shaft to carry the hub, and a rod passing through the driving-shaft for operating the blade-adjusting mechanism.

2. In reversible or feathering screw-propellers; the combination with propeller-blades having spindle ends, and a hollow hub to receive the spindle ends of said blades, said hub being open at its rear end and having an aperture extending from the rearward open end forwardly beyond the propeller-blade spindles, the longitudinal edges of the wall of said hub at such aperture having each a half-bearing to embrace half a blade-spindle, and the curved edge of the hub at the forward end of such aperture being inclined rearwardly; of a removable cover for closing the aperture, said cover having longitudinal edges contacting with the longitudinal edges of the hub-aperture and having at each of said longitudinal edges a half-bearing to embrace the remaining half of each blade-spindle, the forward end of the cover being formed to contact and interlock with the rearwardly-inclined forward edge of the hub-aperture, an end cap for closing the rear open end of the hub and overlying the rear end of the cover to hold the latter in place, means for detachably fixing said end cap in position, mechanism contained within the hub for adjusting the blades about their axes, a tubular driving-shaft to carry the hub and a rod passing through the driving-shaft for operating the blade-adjusting mechanism substantially as set forth.

3. In reversible or feathering screw-propellers; the combination with radial propeller-blades having spindle ends, and a hollow hub to receive the spindle ends of said blades said hub being open at its rear end and having an aperture extending from the rearward open end forwardly beyond the propeller-blade spindles, the longitudinal edges of the wall of said hub at such aperture having each a half-bearing to embrace half a blade-spindle, the curved edge of the hub at the forward end of such aperture being inclined rearwardly, and the open end of the hub being formed with a screw-thread; of a removable cover for closing the aperture, the said cover having longitudinal edges contacting with the longitudinal edges of the hub-aperture and having at each of said longitudinal edges a half-bearing to embrace the remaining half of each blade-spindle, the forward end of the cover being formed to contact and interlock with the rearwardly-inclined forward edge of the hub-aperture, an end cap for closing the rear open end of the hub having a screw-thread formed at its interior forward edge to engage the screw-thread on the rearward end of the hub and overlying the rear end of the cover when screwed up to hold the latter in place, mechanism contained within the hub for adjusting the blades about their axes, a tubular driving-shaft to carry the hub, and a rod passing through the driving-shaft for operating the blade-adjusting mechanism substantially as set forth.

4. In reversible or feathering screw-propellers; the combination with propeller-blades having spindle ends, and a hollow hub to receive the spindle ends of said blades said hub having an aperture through its wall extending forwardly from the rear end of same, the longitudinal edges of said hub at such aperture having each a half-bearing to embrace half a blade-spindle, the curved edge of the hub at the forward end of such aperture being inclined rearwardly, a removable cover for closing the aperture having longitudinal edges contacting with the longitudinal edges of the hub-aperture and having at each of said longitudinal edges a half-bearing to embrace the remaining half of each radial blade-spindle, the forward end of the cover being formed to contact and interlock with the rearwardly-inclined forward edge of the hub-aperture, means for detachably securing the rear end of the cover to the hub, and a guideway within the hub extending longitudinally thereof; of a crank upon each blade-spindle within the hollow of the hub, a block located in the guideway within the hub said block having an inclined groove formed on one of its faces and an oppositely-inclined groove upon its opposite face, means for longitudinally reciprocating the block, a pin on the crank of each blade-spindle entering a groove in the block, and means for reciprocating the block within the hub for adjusting the blades about their axes substantially as set forth.

5. In reversible or feathering screw-propellers; the combination with radial propeller-blades having spindle ends, and a hollow hub to receive the spindle ends of said blades, said hub being open at its rear end and having an aperture extending from the rearward open end forwardly beyond the propeller-blade spindles, the longitudinal edges of the wall of said hub at such aperture having each a half-bearing to embrace half a blade-spindle, the curved edge of the hub at the forward end of such aperture being inclined rearwardly, the rear end of the hub being formed with a screw-thread, a removable cover for closing the hub-aperture, said cover having longitudinal edges contacting with the longitudinal edges of the hub-aperture and having at each of said longitudinal edges a half-bearing to embrace the remaining half of each radial blade-spindle, the forward end of the cover being formed to contact and interlock with the rearwardly-inclined forward edge of the hub-aperture, and an end cap for closing the rear open end of the hub having a screw-thread formed at its interior forward edge to engage the screw-thread on the rearward end of the hub and overlying the rear end of the cover when screwed up to hold the latter in place, and a guideway within the hub extending longitudinally thereof, of a crank upon each blade-spindle within the hollow of the hub, a block located in the guideway within the hub, said block having an inclined groove formed on one of its faces and an oppositely-inclined groove upon its opposite face, a pin on the crank of each blade-spindle entering a groove in the block, a tubular driving-shaft to carry the hub, and an operating-rod passing through the driving-shaft and connected to the block for reciprocating the latter to adjust the blades about their axes substantially as set forth.

In witness whereof I have hereunto set my hand in the presence of two witnesses.

HARRY KNIGHT MILHAM.

Witnesses:
GRIFFITH BREWER,
WILLIAM A. MARSHALL.